United States Patent [19]
Henke et al.

[11] Patent Number: 5,664,825
[45] Date of Patent: Sep. 9, 1997

[54] HAIL PROTECTIVE COVER

[76] Inventors: Robert F. Henke, 3413 Rockbrook, Plano, Tex. 75974; Bryan R. Henke, 30 Tompion La., Saratoga Springs, N.Y. 12866

[21] Appl. No.: 610,335

[22] Filed: Mar. 4, 1996

[51] Int. Cl.[6] ............................................. B60J 11/00
[52] U.S. Cl. ..................... 296/136; 150/166; 160/231.2; 280/770
[58] Field of Search .................... 296/136, 95.1; 150/166; 280/770; 160/230, 231.1, 232.2, 370.21, DIG. 2

[56] References Cited

U.S. PATENT DOCUMENTS

| | | | |
|---|---|---|---|
| 4,699,192 | 10/1987 | Kamen | 150/52 |
| 4,807,922 | 2/1989 | Glover | 296/136 |
| 4,858,985 | 8/1989 | Wojcik | 296/136 |
| 5,242,206 | 9/1993 | Heck | 296/136 |
| 5,287,904 | 2/1994 | Smith | 150/166 |
| 5,292,167 | 3/1994 | Hellman | 296/136 X |
| 5,401,074 | 3/1995 | Timmerman | 296/136 |
| 5,518,289 | 5/1996 | Cobble | 150/166 X |

*Primary Examiner*—David M. Mitchell
*Assistant Examiner*—Kia M. Robinson
*Attorney, Agent, or Firm*—John A. Thomas

[57] ABSTRACT

A cover for protecting vehicles or structures from the damaging impact of hailstones or other falling objects. The cover includes a plurality of energy-absorbing rods disposed parallel and closely adjacent to one another along their long dimensions. The rods are substantially circular in cross section and made of a resilient material. The rods are held in their relative positions by an enclosing means, which may be two flexible sheaths made of a textile. The first and second sheaths are fastened together between and along the long dimensions of the rods, and at the perimeters of the sheaths, so as to enclose and hold the rods, forming the assembled cover. This construction allows the cover to be rolled up for easy storage. The cover has fastening means, such as flanges for tie downs, for attaching the cover to a vehicle to be protected.

7 Claims, 2 Drawing Sheets

(VIEW I-I)

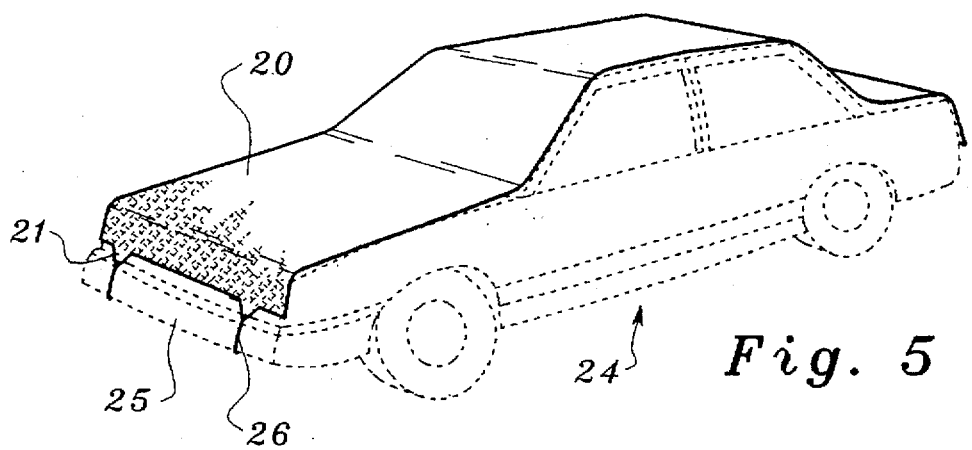
Fig. 5
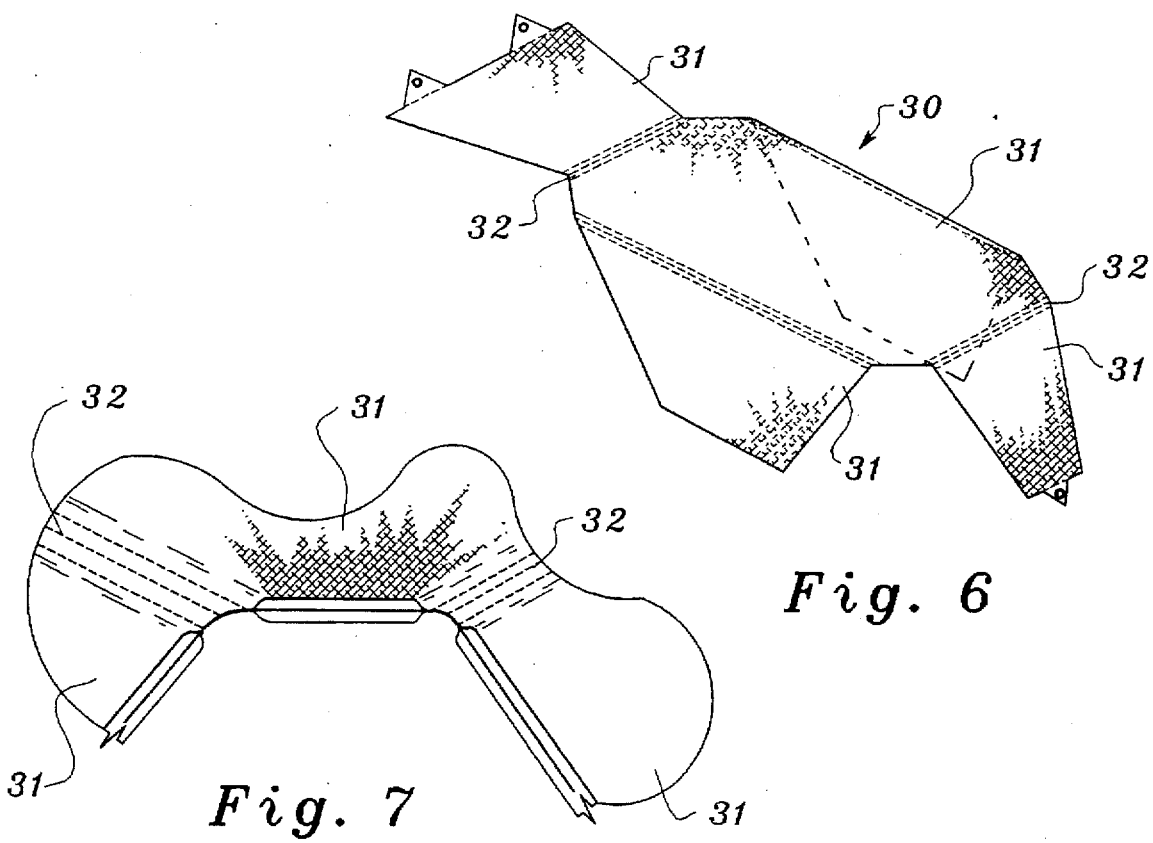
Fig. 6
Fig. 7

HAIL PROTECTIVE COVER

BACKGROUND

This invention relates to the protection of vehicles and structures from damaging impact by hail or other falling objects. Large hailstones can reach high velocities and deliver destructive energy to vehicles, buildings or livestock. For example, a hailstone 10 cm (4 inches) in diameter falls at a speed of 40 meters per second (88 miles per hour) and has a kinetic energy of about 375 kg-m/sec$^2$ (8450 ft-lb/sec$^2$). Smaller hailstones fall more slowly and carry less kinetic energy, but meteorologists consider any hailstone more than 1.9 cm (0.75 inch) in diameter as large enough to cause serious injury or damage. In 1991, U.S. property damage from hail was estimated at $412 million.

Vehicle covers for protection from sun, rain, and snow are well known. However, covers using ordinary textiles are incapable of resisting the impact of large hail. Existing vehicle covers for hail protection either require inflation to form pneumatic cushions, or they are thick, heavy and relatively inflexible. Therefore, there is a need for a protective cover that is strong enough to resist the impact of large hailstones, while, at the same time, is light weight, easily stored, and quickly and easily deployed.

SUMMARY

The present invention is directed to a protective cover that satisfies these needs. A cover having the features of the present invention comprises a plurality of resilient rods laid out parallel and adjacent to one another. The cover has a means for holding the rods parallel and closely adjacent to one another and at the same time allowing the cover to flex along the long dimensions of the rods. The rods all have a substantially circular cross-section. When one or more of the rods are struck by a fast-moving object, the rods will deform to absorb the energy of the impact, and then elastically rebound to substantially their former shape. In the preferred embodiment of the invention, the energy-absorbing rods will be made of a resilient plastic and held in place by a textile enclosure. The first and second parts of the textile enclosure in the preferred embodiment will be sewn between the rods along their lengths, and at the perimeters of the enclosure. Also in the preferred embodiment, the complete cover will have attachments at its perimeter for tie downs so that it may quickly be attached by means of ropes or bungee cords to the vehicle or structure intended to be protected.

The structure of the cover allows it to be rapidly rolled up for storage, and unrolled for use, since it can be flexed between each of the energy-absorbing rods. The simplicity of the adjacent-rod structure means the cover is easy to manufacture. Its dimensions may be easily changed to fit vehicles and structures of various sizes and shapes. Several panels of the enclosed adjacent-rod structure could be fastened together at their perimeters to cover objects of arbitrary shape, since the panels thus joined could bend both along the length of the rods, and also at joints between panels. The rods may be of differing length, so that a cover of other than rectangular shape may be constructed. The protective cover is effective whether it is aligned transversely or longitudinally with respect to the long axis of the object to be protected. These and other features and advantages of the present invention will become better understood with reference to the following description and claims.

DRAWINGS

FIG. 4 is a cross-section through the middle of the cover shown in FIG. 3.

FIG. 5 is an isometric view of the preferred embodiment attached to an automobile.

FIG. 6 is an isometric view of a version of the preferred embodiment formed from multiple panels of the adjacent-rod structure.

FIG. 7 is a cut-away view of the multiple-panel version of the preferred embodiment showing more clearly the flexible joints between the separate panels.

DESCRIPTION

Figure 1:
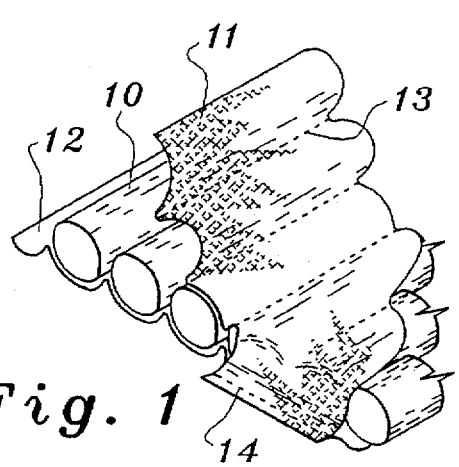
FIG. 1 is an isometric cut-away view of the cover in the preferred embodiment, showing the energy-absorbing rods, the enclosure means for the rods, and the joining means for joining the two parts of the enclosure means.

FIG. 1 shows the disposition of the energy-absorbing rods 10 in the preferred embodiment of the invention. The rods 10 are made of a resilient material capable of absorbing impact energy without substantial permanent deformation. A suitable material would be extruded polyethylene. The rods 10 are substantially circular in cross-section and disposed closely adjacent to one another along their long dimensions. The rods 10 should be positioned and held as close to one another as practicable, so that the rods 10 will not spread apart under impact and allow penetration of the cover by a hailstone or other falling object. For effective protection of underlying surfaces against the largest hailstones, the rods 10 should have a diameter of at least 7 centimeters (2.75 inches). Smaller diameters of the rods 10 may be used if the risk of encountering large hail is deemed acceptable. For example, rods 10 of at least 2.5 centimeters (1 inch) in diameter will give effective protection from golf-ball sized hailstones.

The rods 10 are held in this spatial relationship to one another by an enclosure means. In FIG. 1, this enclosure means consists of a flexible first sheath 11 and a flexible second sheath 12. The two sheaths 11 and 12 are substantially aligned with each other and disposed to enclose the rods 10 between their surfaces. In FIG. 1, the first and second sheaths 11 and 12 of the holding means are a textile, such as polyester fabric, and the first and second sheaths 11 and 12 are sewn together with stitches 13 along the length of, and between, the rods 10, as well as by sewn stitches 14 along the perimeters of the first and second sheaths 11 and 12 of the enclosure means.

Figure 2:
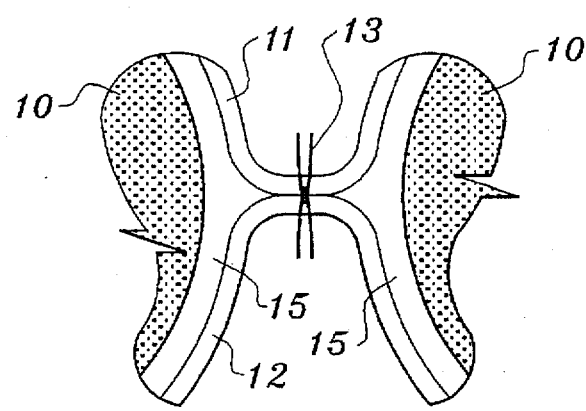
FIG. 2 is an enlarged orthographic view of the energy-absorbing rods, the enclosure means surrounding the rods, and the joining means for joining the two parts of the enclosure means.

As shown in FIG. 2, The sewn stitches 13 shown in the preferred embodiment create chambers 15 from the first and second sheaths 11 and 12, so that the each rod 10 is received by a chamber and held closely to adjacent rods 10. FIG. 2 exaggerates the distances between the adjacent rods 10, and also the distance between the sheaths 11 and 12 and the rods 10 in order to more clearly show that the two parts of the enclosure means are fastened together between the rods and the chambers 15 thereby created. In the preferred embodiment, the rods 10 are held firmly by the enclosing sheaths, 11 and 12 preferably leaving no gap between the rods 10 and the enclosing sheaths 11 and 12.

The reader will appreciate that the method of fastening the two sheaths 11 and 12 of the enclosure means shown in the preferred embodiment need not be sewing, and that stapling, gluing, or thermal welding might also be used. Also, the first and second sheaths 11 and 12 need not be of the same material. For example, the outwardly facing sheath (as viewed with respect to the vehicle or structure protected) might be of a tough and weather-resistant material, while the inwardly facing sheath could be of a softer material to avoid scratching a delicate finish.

Figure 3:
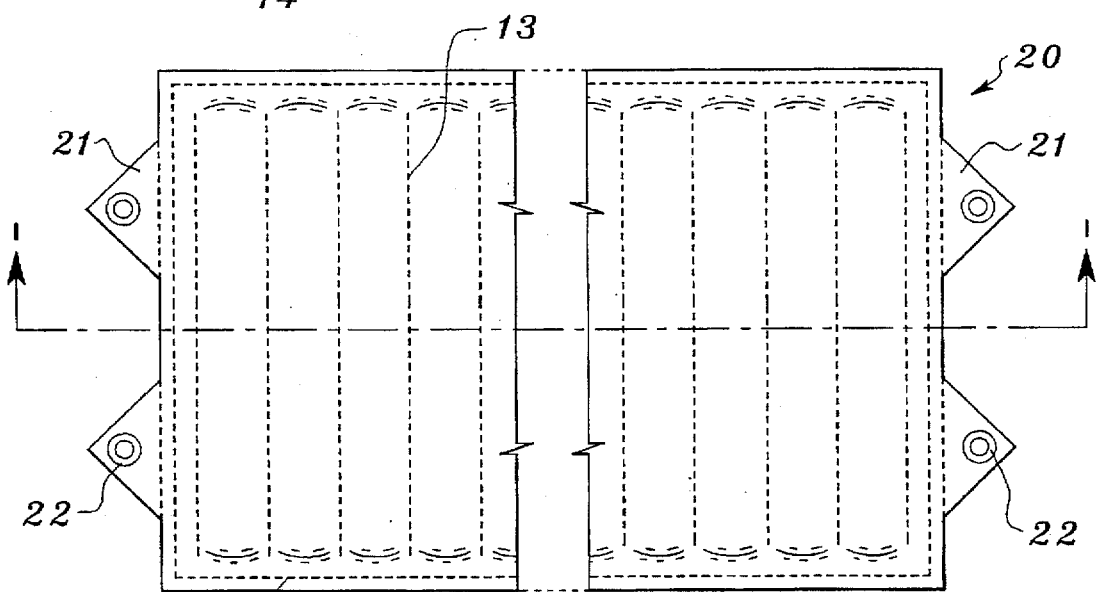
FIGS. 3 and 4 are orthographic views of the preferred embodiment, showing an assembled hail protective cover of rectangular shape.
Figure 4:
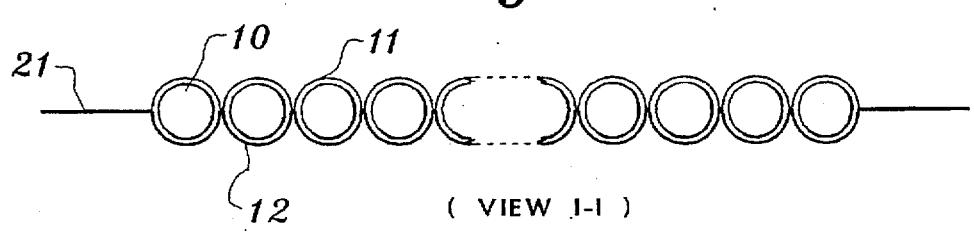

FIG. 3 is an orthographic view of the preferred embodiment of the invention, showing how an assembled cover 20 is formed by a plurality of rods 10, held in alignment by an enclosure formed by the first sheath 11 and the second sheath 12. The preferred embodiment has fastening means consisting of flanges 21, each flange 21 having a grommet 22 for the attachment of tie downs, such as ropes or bungee cords. FIGS. 3 and 4 also show how the first and second sheaths 11 and 12 are sewn together along the length of and between the rods and around the perimeters of the sheaths, 11 and 12 in the preferred embodiment. FIG. 4 is a cross-sectional view through FIG. 3, showing the rods 10 held closely adjacent to one another by the sheaths 11 and 12.

If a hailstone strikes the cover 20, the hailstone will strike either one rod 10 directly, or it will fall into the gap formed by the circumferences of two adjacent rods 10. In the first case, the one rod 10 struck will be compressed radially by the impact, thereby absorbing the energy of the impact and protecting the surface of the vehicle or structure inside the cover. The compressed rod 10 will rebound elastically and substantially resume its former shape. In the second case, where the impacting object falls into the gap created by the circumference of two adjacent rods 10, both rods 10 will be compressed radially and be bent apart, thereby absorbing the energy of the impact to the same or greater degree than in the first case. Again, the compressed rods 10 will rebound elastically and substantially resume their former shapes. The enclosure means holding the plurality of rods 10 in place prevents any two rods 10 from spreading far enough apart to allow penetration of the cover 20 by a falling object.

The reader will see that the invention may be adapted to protect any vehicle or structure. A typical use would be a cover for a vehicle, as shown in FIG. 5. FIG. 5 depicts an embodiment of the invention sized to cover an automobile 24 from front to back. The cover 20 is laid over the top of the automobile 24, and fastened in place by tie downs 26 attached at their first ends to the grommets 22 in the flanges 21, and at their second ends under the bumper 25 of the automobile 24. Of course, other temporary fastening means could be used, such as straps or magnets.

FIG. 6 shows a version of the preferred embodiment in which a protective cover 30 is formed from a plurality of separate panels 31 of the adjacent-rod structure. Each panel 31 is joined at least one of its edges to another panel by a flexible joint 32. The flexible joints 32 may be formed by sewing, gluing, or thermal welding of the enclosing sheaths 11 and 12, or by similar conventional means. FIG. 7 is a cut-away view of the multiple-panel cover 30 depicted in FIG. 6, showing more clearly the flexible joints 32 joining the separate panels 31.

Covers of multiple panels may be specially fabricated to fit diverse objects requiring protection from hail, such as motorcycles, small buildings, glass windows, livestock, or even human beings.

The reader will see that the need for a light-weight, easily stored, quickly deployed, and effective protective cover has been attained by the present invention, as described above. Since certain changes could be made in the embodiment of the invention described above without departing from the spirit and scope of the invention, we intend that all matter contained in the foregoing description and drawings shall be interpreted as illustrative and not in a limiting sense. For example, in another embodiment of the invention, the means for holding the rods 10 parallel and closely adjacent to one another could be a plurality of flexible cords strung through holes drilled in the rods 10 across their diameters.

The reader should understand that the following claims are intended to cover all of the generic and specific features of the invention herein described and all statements of the scope of the invention which might be interpreted to fall between these features.

We claim:

1. A cover suitable for hail protection comprising:
   (a) a plurality of rods of a resilient material, the rods having substantially circular cross-sections, the rods being disposed parallel and not more than 1.9 centimeters apart along their long dimensions, and,
   (b) means for holding the rods parallel and not more than 1.9 centimeters apart so that the cover may flex along the long dimensions of the rods.

2. The cover according to claim 1 above, wherein the means for holding the rods parallel and not more than 1.9 centimeters apart comprises:
   (a) an enclosure comprising a first flexible sheath and a second flexible sheath, the first sheath being substantially aligned with the second sheath; the two sheaths disposed to enclose the rods, and,
   (b) joining means for attaching the first and second flexible sheaths of the enclosure to each other along and between the lengths of the rods so as to form a plurality of chambers for receiving and holding each rod, and,
   (c) joining means for attaching the perimeters of the first and second flexible sheaths of the enclosure to each other, so as to enclose the chambers and the rods.

3. The cover according to claim 2 above, wherein the joining means for attaching the first and second flexible sheaths of the enclosure to each other between the rods is sewn stitches.

4. The cover according to claim 2 above, wherein the joining means for attaching the first and second flexible sheaths of the enclosure to each other at the perimeters of the first and second flexible sheaths is sewn stitches.

5. The cover according to claim 2 above wherein fastening means are connected to the enclosure for fastening the cover to an object to be protected.

6. The cover according to claim 5 above wherein the fastening means are:
   (a) two or more flanges fastened to the enclosure at the perimeter thereof, and,
   (b) one or more grommets set into each of the flanges.

7. A cover suitable for hail protection comprising:
   (a) a plurality of panels, each panel comprising
      (1) a plurality of rods of a resilient material, the rods having substantially circular cross-sections, the rods being disposed parallel and not more than 1–9 centimeters apart along their long dimensions, and,
      (2) means for holding the rods parallel and not more than 1.9 centimeters apart so that the cover may flex along the long dimensions of the rods; and,
   (b) a plurality of flexible joints, each flexible joint connected to edges of two adjacent panels, so that the cover may flex along the flexible joints.

* * * * *

UNITED STATES PATENT AND TRADEMARK OFFICE
CERTIFICATE OF CORRECTION

PATENT NO. : 5,664,825
DATED : September 9, 1997
INVENTOR(S) : Robert F. Henke and Bryan R. Henke It is certified that error appears in the above-identified patent and that said Letters Patent is hereby corrected as shown below:

In column 4, line 58, change "1-9" to -1.9-.

Signed and Sealed this

Twentieth Day of January, 1998

Attest:

BRUCE LEHMAN

Attesting Officer

Commissioner of Patents and Trademarks